United States Patent
Ahad

(10) Patent No.: US 7,024,656 B1
(45) Date of Patent: Apr. 4, 2006

(54) PERSISTENT AGENTS

(75) Inventor: Rafiul Ahad, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/577,967

(22) Filed: May 25, 2000

Related U.S. Application Data

(60) Provisional application No. 60/167,676, filed on Nov. 29, 1999, provisional application No. 60/198,258, filed on Dec. 17, 1999.

(51) Int. Cl.
*G06F 9/44* (2006.01)

(52) U.S. Cl. .................................................. 717/116
(58) Field of Classification Search .................. 717/116
See application file for complete search history.

(56) References Cited

U.S. PATENT DOCUMENTS 5,295,256 A * 3/1994 Bapat ........................ 717/137
5,809,508 A * 9/1998 Blackman et al. ......... 707/103 R
6,012,067 A * 1/2000 Sarkar ....................... 707/103 R
6,061,515 A * 5/2000 Chang et al. ............... 717/114
6,085,198 A * 7/2000 Skinner et al. ............ 707/103 R
6,233,582 B1 * 5/2001 Traversat et al. ............ 707/102
6,321,261 B1 * 11/2001 Glass .......................... 709/223
6,339,782 B1 * 1/2002 Gerard et al. ................. 718/1
6,341,289 B1 * 1/2002 Burroughs et al. ......... 707/104.1
6,351,751 B1 * 2/2002 Traversat et al. ......... 707/103 Y
6,374,254 B1    4/2002 Cochran et al.
6,374,256 B1    4/2002 Ng et al.
6,571,252 B1 * 5/2003 Mukherjee ................... 707/10

* cited by examiner

*Primary Examiner*—Wei Y. Zhen
*Assistant Examiner*—May Steelman
(74) *Attorney, Agent, or Firm*—Hickman Palermo Truong & Becker, LLP; Christopher J. Brokaw

(57) ABSTRACT

Object persistence is facilitated by introducing persistent agents to act as bridges between the programming model and the database model. Persistent agents are instantiated on a per-class basis and are responsible for mapping their class to a suitable database related. Methods are defined for the persistent agent to specify database-specific properties and optimization hints.

13 Claims, 3 Drawing Sheets

PERSISTENT AGENTS

RELATED APPLICATIONS

The present application claims the benefit of U.S. Provisional Patent Application Ser. No. 60/167,676, entitled "Use of Persistent Agents to Seamlessly Store Java Objects in a Database" filed on Nov. 29, 1999 by Rafiul Ahad, the contents of which are hereby incorporated by reference.

The present application claims the benefit of U.S. Provisional Patent Application Ser. No. 60/198,258, entitled "Persistent Agents" filed on Dec. 17, 1999 by Rafiul Ahad, the contents of which are hereby incorporated by reference.

FIELD OF THE INVENTION

The present invention relates to computer systems and more particularly to storing and retrieving persistent objects.

BACKGROUND OF THE INVENTION

Typically, most objects created by a process are destroyed when that process terminates. A persistent object, however, is an object whose lifetime can exceed the lifetime of the process that creates or accesses the object. Object persistence is therefore a useful property for those objects instantiated in one process that carry information needed by other processes. For example, it may be desirable for one JAVA™ application to access the objects previously created by another Java application.

A first approach for implementing object persistence is to serialize the entire object into a structured sequence of bytes and store the serialized object into a file, a database, or other persistent object store. When the serialized object is needed by another process, the serialized object is deserialized back into a run-time object and used by that other process.

One drawback to this first approach is that it does not efficiently support the selective retrieval of persistent objects from the persistent object store. For example, a persistent object store may contain a plurality of employee objects, each identified by a name, social security number, and a position title. If an application wishes to retrieve all the software engineers from the persistent object store in accordance with this first approach, each employee object would have to deserialized back into a run-time object so that the object's position title field can be inspected to determine if the position title for the object is actually a software engineer. As a result, many objects are deserialized, which is an expensive operation, whether or not the objects are actually wanted.

Accordingly, a second approach has been developed to store persistent objects as rows in a database table, in which the columns of the database table correspond to fields of the persistent object. Since the fields of persistent object are stored in separate columns of the database table, these columns can be indexed and accessed by a database server so that the identifying which persistent objects satisfy a particular condition can be efficiently performed, e.g. by a B-Tree lookup. In the example, the persistent employee objects would be stored as rows in an employee table having one column for the name of the employee, another column for the social security number, and a third column for the position title. Thus, retrieving all the software engineers from among the persistent employee objects can be quickly performed simply by executing a "select" statement in the Structured Query Language (SQL) that uses an index built on the position title column. Consequently, the second approach promises to exploit the high-performance data storage and retrieval technology of modern database systems.

A major source of difficulty with conventional implementations of the second approach is due to an "impedance mismatch" in creating a direct object-relational mapping between the programming model and the database model. The programming model support a rich set of features for objects; for example, the programming model typically supports inheritance, polymorphism, multi-valued attributes, which are not easily handled in the database model. On the other hand, the database model employs concepts such as transaction semantics (commit, rollback), primary keys, foreign keys, uniqueness constraints, and other concepts that lack an immediate analog in the programming model. Therefore, the implementation of such a direct object-relational mapping involves much overhead.

Furthermore, the direct object-relational mapping is statically implemented for each class of object that may be persistent, adding persistence to the class interface. Thus, the overhead for implementing persistence in each class is incurred again and again for each new class. In addition, the direct object-relation mapping is fixed at compile-time, so that any changes made to the class must be reflected in re-coding the implementation of persistence for the class.

Attempts have been made to provide the implementation of persistence in a "persistent object" base class. Thus, the programmer designing the classes for persistent objects must derive these class from the persistent object base class. In single-inheritance languages such as JAVA™, however, this attempt compels the programmer to derive almost every class from the persistent object base class, which adds persistence to the interface of all of such classes, even if unneeded for particular classes, just to permit the use of polymorphism. Another attempt to reduce the programming overhead is by special pre-processing or post-processing of non-persistent classes to make the instances of the classes persistent. However, such pre-processing and post-processing greatly complicates the maintenance of the software and creates further opportunities for error when the pre-processing and post-processing are not consistently applied.

Therefore, there is a need for reducing the overhead and difficulties associated implementing persistence for objects of many different classes whose fields are to be stored in corresponding columns of a database, and whose structure may change over time (schema evolution).

SUMMARY OF THE INVENTION

These and other needs are addressed by the present invention by separating persistence from modeling by providing "persistent agents." The present invention stems from the realization that persistence is orthogonal to modeling, in the sense that the choice of making objects of a class persistent should be independent of the design of the class's interface or implementation. In other words, when designing classes for an application, the programmer need not take persistence into account. Thus, the programmer should not be required to code the direct object-relation mapping in the programmer's new classes, inherit the new classes from a persistence-capable interface, pre-process or post-process the new classes to make the instances of the new classes persist beyond the lifetime of the process that creates the instances.

Orthogonality of persistence is provided by creating a "persistent agent" for every class whose instances need to persist. A persistent agent is an object that maps the constructs of a programming language to a database model. The persistent agent permits database concepts such as primary keys and foreign keys to augment the programming constructs. A persistent agent is a dynamic map in a sense that if changes are made to a programming construct (such as adding a new field), then those changes could be incorporated into the corresponding database structure simply by calling appropriate methods in the persistent agent.

In one embodiment, a persistent agent is instance of a class that implements a "persistent agent" interface of an application programming interface (API) for applications to store and retrieve objects persistently. A persistent agent for a class may be simply created by invoking a method in another interface of the API with the fully-qualified name of the class, and provides a way to store and retrieve objects of that class to and from a persistent object store. Database concepts such as primary keys and other constraints can be specified by invoking methods of the persistent agent. In addition, optimization hints such as specifying which fields of the object will be updated are also specified using the persistent agent.

Accordingly, one aspect of the invention involves a computer-implemented method and a computer-readable medium bearing instructions for persistently storing an object belonging to a class, by creating a persistent agent based on a class and storing the object in a persistent object store based on the persistent agent. The persistent agent provides an interface for persistently storing the object in the persistent object store.

Another aspect of the invention pertains to a computer-implemented method and a computer-readable medium bearing instructions for retrieving a set of objects from a persistent object store, by: creating a persistent agent based on a class and retrieving the set of objects in the persistent object store based on the persistent agent. The persistent agent provides an interface for retrieving a set of objects from the persistent object store.

Yet another aspect of the invention is an application programming interface (API) for persistent object storage that includes routines for: instantiating the persistent agent based on the class of an object; storing the object in a persistent object store; and retrieving a set of objects from the persistent object store based on a predicate.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for object persistence are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Hardware Overview

Figure 1:
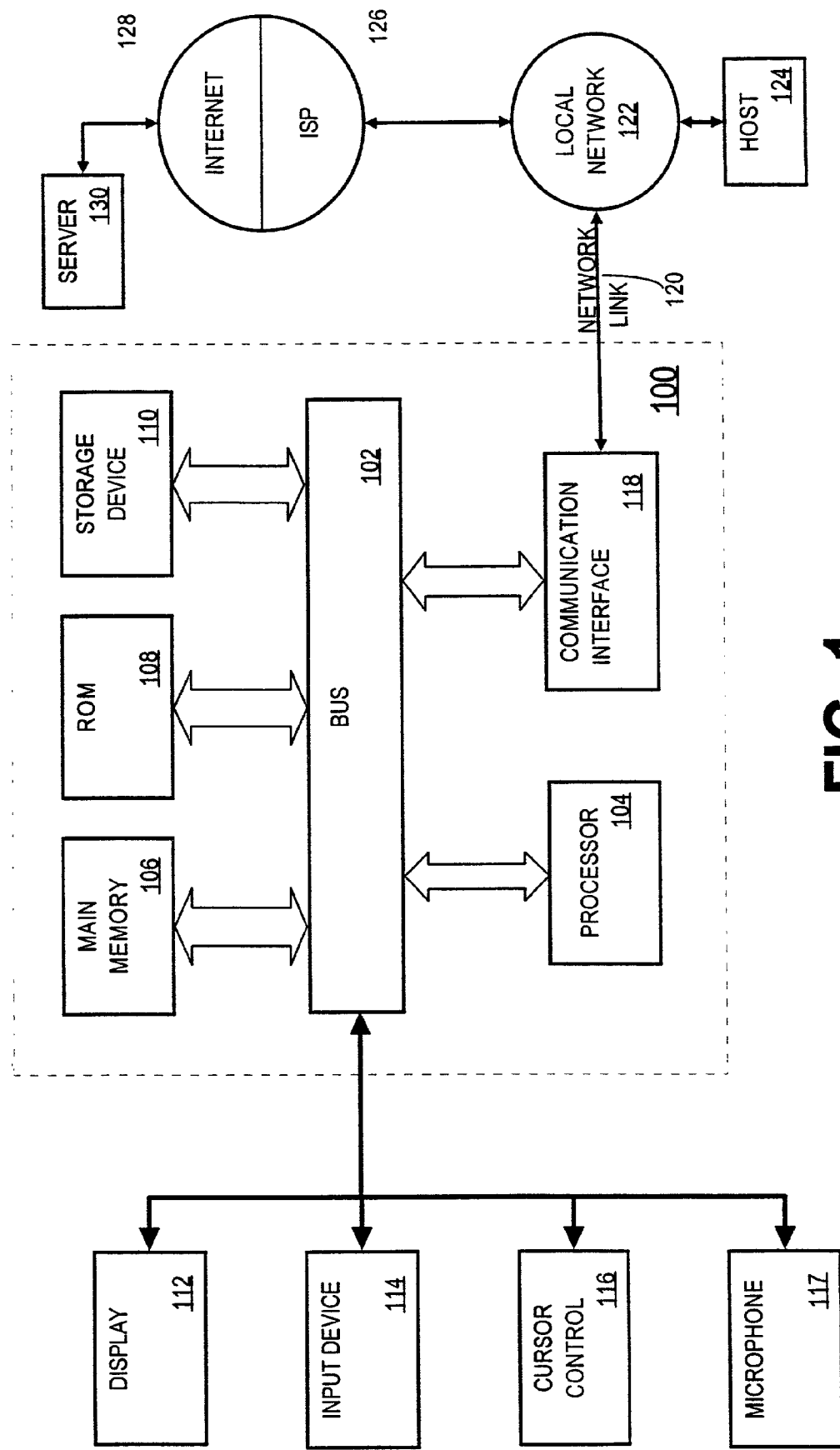
FIG. 1 depicts a computer system that can be used to implement an embodiment of the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. Another input device can be a microphone 117.

The invention is related to the use of computer system 100 for storing and retrieving persistent objects. According to one embodiment of the invention, storing and retrieving persistent objects is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for storing and retrieving persistent objects as described herein. The received code may be executed by processor 104 as it is received, and/or stored in storage device 110, or other non-volatile storage for later execution. In this manner, computer system 100 may obtain application code in the form of a carrier wave.

A Persistent Object Model

In accordance with one embodiment of the present invention, the following persistent object model is adopted within a JAVA™ programming language environment. Although the following description refers to the JAVA™ programming language environment, it is to be understood that the concepts of the present invention are not necessarily limited to the Java programming language environment, but, on the contrary, may be applied in other object-orient programming language environments as well.

Under such a persistent object model, any object can be stored persistently in a persistent object store. A persistent object store is a computer-readable medium providing a long-term storage, such as a file system or database, capable of storing objects beyond the lifetime of any process that created or accessed the objects. In some implementations, the persistent object store can be chosen to provide data synchronization for a mobile user using a laptop, such as by storing persistent objects in updateable snapshots that are replicated to a host database system when the mobile user dials up the host database system. Updateable snapshots are described in more detail in a mobile user environment in the co-pending, commonly assigned U.S. patent application Ser. No. 09/322,152 entitled "Data Replication for Front Office Automation" filed on May 28, 1999 by Souder et al., now U.S. Pat. No. 6,532,479, issued Mar. 11, 2003, whose contents are incorporated by reference in their entirety.

For appropriate implementations of the persistent object store, especially for databases, all operations against a persistent object store are done within a "session," which represents a connection to the persistent object store and provides appropriate transaction semantics (e.g. commit and rollback) for those operations. In one example, a session is created by calling a "connect" method of the persistent object store interface and is thus represented by a JAVA™ object that implements a "persistent object store session" (POSSession) interface.

Before an object can be stored in a persistent object store, a persistent agent is created in the persistent object store for the class the object belongs to. In one example, this may be done by calling a "create persistent agent" method of a session and supplying the method with the fully-qualified class name of the class as one of the arguments. As explained hereinafter, desired database constraints can also be supplied to the "create persistent agent" method.

A persistent agent serves to efficiently represent a particular class for the purpose of providing persistence of the instances of the class. Thus, method are defined for the persistent agent to store, retrieve, and update objects, as well as to query meta-information such as fields and the field types defined for the class. In accordance with the database model, all updates performed on an object stored or retrieved by the persistent agent can be committed or rolled back as part of the session in which the object is created.

A persistent agent stores the state of objects belonging to the class for which the persistent agent was instantiated in the persistent object store by mapping the field values of the objects to appropriate portions of a database object, such as a table. For example, the persistent agent may create a table to hold persistently stored objects in rows and store the non-array fields of the object in corresponding columns. The elements of an array field of the object can be stored, for example, either entirely within a column of the table or in rows of another table allocated to hold objects of the array.

In one implementation, the fields of the JAVA™ object can be identified based on the fully-qualified JAVA™ class name by using the Java Reflection API. Thus, the values of the various fields are read from the object using the Java Reflection API and stored in the persistent object store, for example, by appropriate SQL commands. If any of the fields refer to an object of a JAVA™ reference type that is not user-defined (e.g. String or int), the persistent agent makes a copy of that object and stores it in the persistent object store. If any of the fields refers to an object of a user-defined class, on the other hand, an already instantiated persistent agent for that user-defined class may be used to retrieve the reference to the object which is then stored in the persistent object store. However, if there is no such persistent agent instantiated for the user-defined class, a default persistent agent for the user-defined class can be automatically created with default properties or simply ignored. This behavior can be specified by setting a property for the persistent agent.

Various options and optimization hints can be specified in the persistent agent corresponding to a class for retrieving persistent objects belonging to the class. For example, these options could include specifying which fields are be retrieved, which fields the application intends to update, whether to retrieve references to other objects, and whether to materialize referenced objects.

An Exemplary Object Persistence API

In accordance with one embodiment of the present invention, the following API is employed for providing object persistence, including a PersistentObjectStore interface, a POSSession interface, and a PersistentAgent interface.

TABLE 1 illustrates a PersistentObjectStore interface for modeling a persistent object store that stores objects persistently, which, as explained herein above, can be a relational database, a file system, updateable snapshots, and the like.

TABLE 1

```
public interface PersistentObjectStore {
    public POSSession connect (Properties connParameter)
throws POSException;
    public POSSession connect (String user, String
password) throws POSException;
    public String getVersion( );
    public Properties getProperty( );
}
```

The connect( ) methods allow the programmer to create a session with a persistent object store, either by supplying a name and password for a particular user or in an implementation-defined manner with the connParameter argument. A getVersion( ) method returns the version of the persistent object store, and a getProperty( ) method returns implementation-defined properties of the persistent object store.

Once the programmer has connected to a persistent object store and has thereby created a session, the programmer can use the session to create persistent agents and manage the transaction semantics for the persistent object store. TABLE 2 illustrates a POSSession interface for modeling a connection to a persistent object store, with support for the atomicity of operations being performed against persistent object during a session.

TABLE 2

```
public interface POSSession {
    public PersistentAgent createPersistentAgent (String
javaClassRef, Properties props) throws POSException;
    public PersistentAgent findPersistentAgent (String
javaClassRef) throws POSException;
    public void dropPersistentAgent (PersistAgent p)
throws POSException;
    public String [ ] getPersistentJavaClasses( );
    public static final String ISOL_DIRTY_READ =
"DirtyRead";
    public static final String ISOL_READ_COMMITTED =
"ReadCommitted";
    public static final String ISOL_REPEATABLE_READ =
"RepeatableRead";
    public static final String ISOL_SERIALIZABLE =
"Serializable";
    public void beginTransaction(String isolationLevel);
    public void commit( );
    public void rollback( );
}
```

Invoking a createPersistentAgent( ) method creates the necessary data structures in the persistent object store, such as tables in a database, and returns an instantiated persistent agent for a given JAVA™ class. The javaClassRef parameter is a fully-qualified name of the class, so that the Java Reflection API can be used to identify and access the fields of instances of the class. The props parameter is for specifying the properties of the persistent agent. For example, the following properties may be supported:

PrimaryKey, whose value is a space-separated list of field names that constitute the primary key to be used by the persistent agent in storing and retrieving the persistent object from the persistent object store. A class need not have a primary key, and a primary key values must be unique and non-null.

NonNullFields, whose value is a space-separated list of field names for fields whose values are not allowed to be null.

NoAgentAction, whose possible values are POSSession.CREATE or POSSession.NULLIFY to specify the action taken by the persistent agent when storing fields of the current class object that happen to lack a corresponding, instantiated persistent agent. The POSSession.CREATE value means that a default persistent agent is created for such a field is instantiated and used to store the contents of the field, thereby making a closure of the persistent object. On the other hand, the POSSession.NULLIFY values means that the field should be ignored, for example, by setting the field to null.

Preferably, the data structure in the persistent object store created by invoking the createPersistentAgent( ) method has portions that correspond to respective fields of objects that belong to the class for which the persistent agent was just created. For example, a table can be created to hold persistently stored objects in rows would store non-array fields of the object in corresponding columns of the table. The elements of an array field of the object can be stored, for example, either entirely within a column of the table or in rows of another table allocated to hold objects of the array.

A findPersistentAgent( ) method allows for a previously instantiated persistent agent to be returned for a class, if it exists. A dropPersistentAgent( ) method allows for the persistent agent to be destroyed. Finally, invoking a getPersistentJavaClasses( ) method returns a list of those classes for which a persistent agent has been instantiated.

The POSSession interface provides for transaction semantics that are appropriate for using a database as the persistent object store. For example, a beginTransaction( ) method allows the programmer to start a transaction in the session with one of four isolation levels: "DirtyRead", "ReadCommitted", "RepeatableRead", and "Serializable". In addition, invoking the commit( ) method causes all changes made to the persistent object store for this session to be made permanent, and invoking the rollback( ) method causes changes since the beginning of a transaction or since the last commit.

Once the programmer has instantiated a persistent agent for a particular class, the programmer can use the persistent agent to persistently store and retrieve objects belong to that class, as well as, specify optimization hints for handling the persistent objects in the persistent object store. TABLE 3 illustrates a PersistentAgent interface for modeling a persistent agent, which has been created for a particular class.

TABLE 3

```
public interface PersistentAgent {
    public void store (Object obj) throws POSException;
    public Object[ ] retrieve(String predicate) throws
POSException;
    public void delete (Object obj) throws POSException;
    public final short DONT_RETRIEVE            = 0;
    public final short RETRIEVE                 = 1;
    public final short CREATE_REFERENCED_OBJECT = 3;
    public final short WILL_BE_UPDATED          = 4;
    public final short
CREATE_REFERENCED_WILL_BE_UPDATED = 7;
    public final short UNIQUE_INDEX             = 5;
    public final short NON_UNIQUE_INDEX         = 6;
    public String[ ] getPrimaryKeyFields( );
    public boolean fieldCanBeNull(String fieldName);
    public void createIndex(String indexName, String[ ]
fieldNames, short indexKind) throws POSException;
    public void dropIndex(String indexName) throws
POSException;
    public String[ ] getIndexes( );
    public String [ ] getIndexFields (String indexName)
throws POSException;
    public short getIndexKind(String indexName) throws
```

TABLE 3-continued

```
POSException;
    public String[ ] getFields( );
    public String getType (String fieldName) throws
POSException;
    public short getFieldAccessMode (String fieldName)
throws POSException;
    public void setFieldAccessMode (String fieldName,
short mode) throws POSException;
}
```

The PersistentAgent interface provides the basic functionality for storing and retrieving objects from the persistent object store. For example, invoking a store( ) method causes the object indicated by the obj parameter to be stored in the persistent object store. Exceptions could be raised if any of the fields in the primary field is null, if the primary key already exists, or if there is already another persistent object in the class with the same value in a field that has a unique index for the field. In one implementation, when an object is stored in the persistent object store, the fields of the object are mapped to corresponding portions of the data structures in the persistent object store, such as to corresponding columns of a database table. In addition, the identity of this object is saved in an ancillary set-like data structure such as a hash table to keep track of which objects are part of the persistent object store.

As another example, invoking a retrieve( ) method causes zero or more objects to be returned in and Object [ ] array that satisfies a given predicate, which is indicated by the predicate parameter. Preferably, the retrieve( ) method should support relative comparisons of field names with constants and Boolean operators, such as the following predicate: "name=\"Smith\" and age>40" where name and age are fields whose types are primitives. Exceptions may be raised if the predicate is malformed, if the field does not exist, or if the field type is not supported (e.g. for user-defined types). In one implementation, when objects are retrieved from the persistent object store, the predicate is converted into a SQL statement with the predicate in a WHERE clause to obtain a list of rows, whose columns are then mapped into fields of respective objects. To avoid the so-called shared object problem, in which different instances are created for the same persistent object, the persistent agent can maintain a hash table or other set-like data structure to check if the object corresponding to the row was already instantiated. If the object was already instantiated, then that instantiated object is used; otherwise the object is instantiated and its fields are populated with values from the corresponding portions of the table or tables.

A delete( ) method is provided for deleting objects from the persistent object store.

Relational database properties and optimization hints can be provided and queried through other methods of the PersistentAgent interface. For example, invoking a getPrimaryKeyFields( ) method returns a space-separate list of the fields in the object that constitute a primary key. A primary key is a set of columns that are unique and non-null, which can serve to uniquely each row in the table. Those fields of the object that constitute the primary key are specified when the persistent agent is created. In addition, a fieldCanBeNull( ) method can be used for querying whether a field is allowed to be null. The fields that cannot be null were previously specified in a space-separated list when the persistent agent was created.

Indexes, which enable faster retrieval times, can be built on particular fields with a create Index( ) method, which takes as parameters the name of the index to be created (indexName), the space-separated names of the fields upon which the index is built (fieldNames), and whether a uniqueness constraint is imposed on the fields (indexKind), which would raise an exception if a non-unique field values were stored in the persistent object store. Administrative methods for managing indexes may also be provided, such as a dropIndex( ) method for deleting indexes, a getIndexes( ) method for returning an array of all the indexes defined for the persistent agent, a get IndexFields( ) method for returning the fields upon which a specified index is built, and a getIndexKind( ) method for indicating whether the index imposes a uniqueness constraint.

In addition, a getFields( ) method is provided to returning the names of the fields defined on the persistent agent and thus the corresponding object. In a JAVA™ implementation of this interface, all declared and inherited, private, protected, package, and public fields must be returned that are not declared to be transient and that are not inherited from classes in the Java.lang package. Finally, a getType( ) method is supplied for providing the fully-qualified name of the type or class of a particular field.

The getFieldAccessMode( ) and setFieldAccessMode( ) methods are provided for manipulating the access mode of a given field. The access mode can be one of the following: DONT_RETRIEVE, which indicates that the retrieve( ) method should not retrieve this field; RETRIEVE, which indicates that the retrieve( ) method should retrieve this field; CREATE_REFERENCE_OBJECT, which indicates that if the field references a user-defined type, then the retrieve( ) method should create an instance of the referenced type and set the field to that object reference (otherwise, the retrieve( ) method would set the field to null); WILL_BE_UPDATED, which indicates that the field will be updated (in some implementations, updates to such fields are the only ones that applied to the persistent object store for performance reasons); and CREATE_REFERENCE_WILL_BE_UPDATED, which indicates a combination of the above two cases.

Storing Persistent Objects

Figure 2:
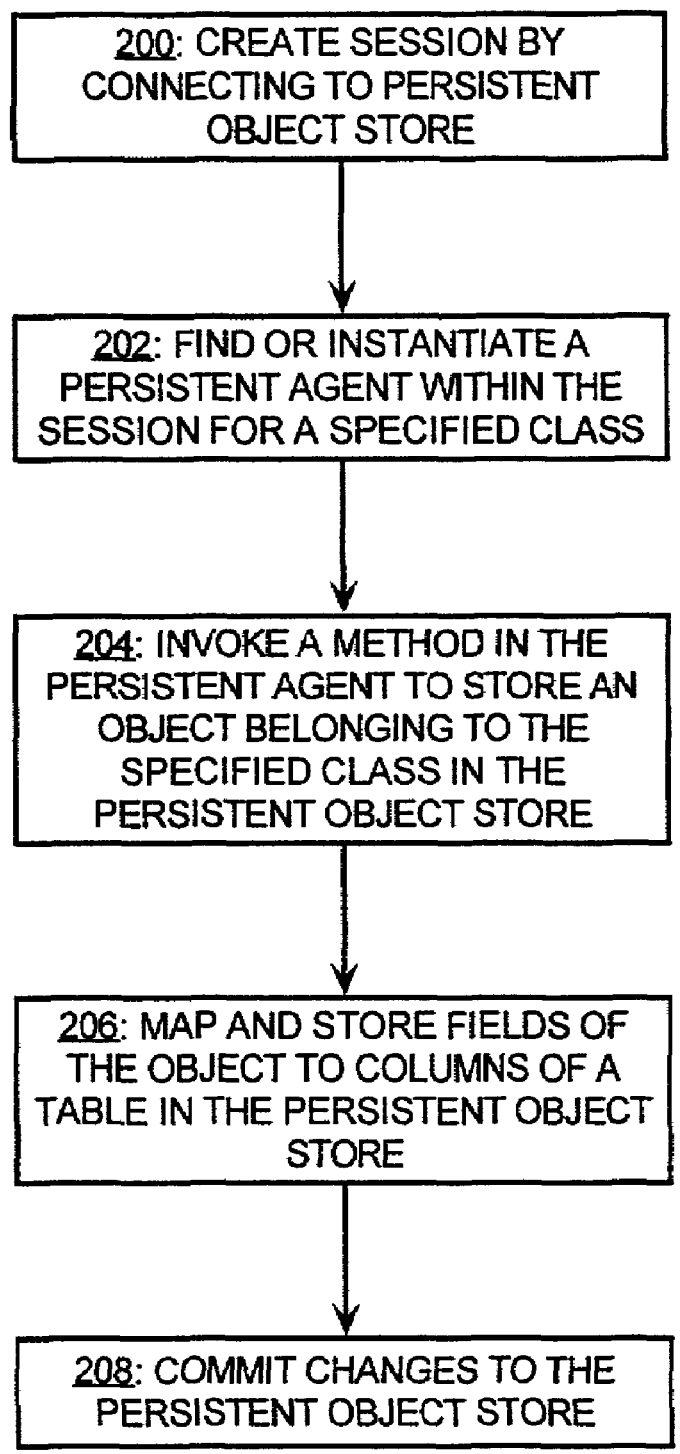
FIG. 2 is a flowchart illustrating the operation of one example of persistently storing an object in accordance with an embodiment of the present invention.

FIG. 2 is a flowchart illustrating the operation of one example of persistently storing an object in accordance with an embodiment of the present invention. At step 200, a session is created by connecting to a persistent object store. This step can be performed by calling the connect( ) method of the persistent object store interface with appropriate parameters, such as the name and password. For example, one can connect to an OracleLite™ database as Persistent ObjectStore pos putting the result in a sess variable with the following code fragment:

POSSession sess=pos.connect(null);

At step 202, a persistent agent is found or instantiated corresponding to the class the object belongs to. For example, if the object belongs to a class POSData {String Date; String Time; int channel; int duration;}, then the method invocation to instantiate the persistent agent can be done with the following code fragment:

PersistentAgent pa=sess.createPersistentAgent("POSData", null);

In response, the fields of the POSData class are inspected to create a corresponding table (termed, for example, POSData) in the OracleLite™ database having four columns: date, time, channel, and duration. Since the Date and Time fields of the class are strings, the corresponding date and time columns are varchars, and the channel and duration int fields correspond to number columns. If POSData class were to include a user-defined type, then a persistent agent corresponding to that user-defined would also be instantiated if specified. Also, if the POSData class were to include a system type that does not easily correspond to a database type (such as a property), then the persistent agent would treat that type as a user-defined type but employ a vendor-provided persistent agent for that system type. Since the prop parameter was null in this example, no fields of the POSData table constitute a primary key nor cannot be null. Alternatively, the findPersistentAgent( ) method can be invoked to find a persistent agent if the persistent agent already exists.

At step 204, the store( ) method of the persistent agent is invoked to store an object belonging to the class the persistent agent was created for in the persistent object store. In this example, the following code fragment could be used for a POSDATA object pd, where pa is the persistent agent:

pa.store(pd);

In response to this method invention, as set forth as step 206, the persistent agent maps the fields of the object to the corresponding columns of the database table and stores the values of the fields in the corresponding columns. In addition, the persistent agent updates an internal data structure such as a hash table or other set-like data structure to keep track of which objects are now part of the persistent object store. In this example, the pd object is recorded in the hash table.

At step 208, changes to objects controlled by the persistent agent are committed to the persistent object store, including changes made to retrieved objects of field that have been specified to be WILL_BE_UPDATED. If the persistent object store is a relational database, for example, these changes may be committed by a commit statement. For less sophisticated data stores, as another example, the objects are kept in virtual memory and are only written to disk when the commit takes place. The following code fragment could be used to cause performance of this step:

sess.commit( );

Retrieving Persistent Objects

Figure 3:
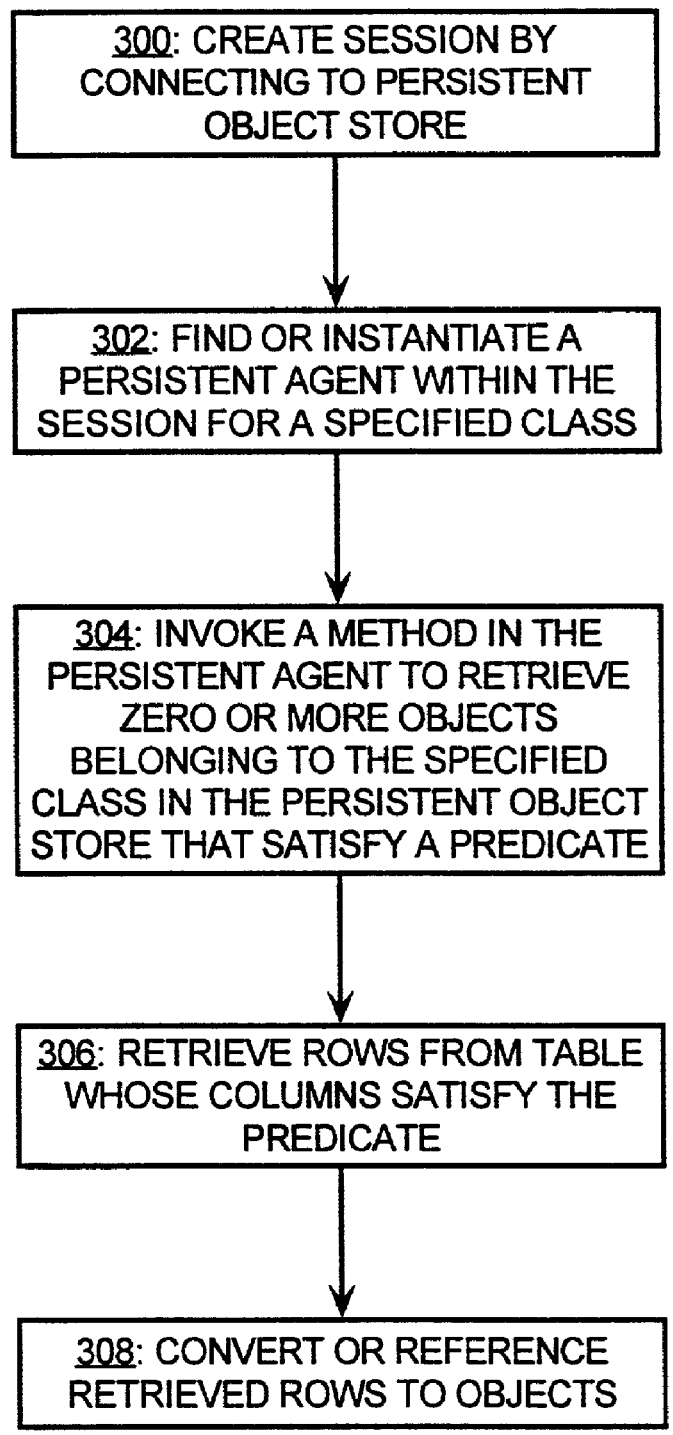
FIG. 3 is a flowchart illustrating the operation of one example of retrieving persistent objects in accordance with an embodiment of the present invention.

FIG. 3 is a flowchart illustrating the operation of one example of retrieving persistent objects in accordance with an embodiment of the present invention. At step 300, a session is created by connecting to a persistent object store. This step can be performed by calling the connect( ) method of the persistent object store interface with appropriate parameters, such as the name and password. For example, one can connect to an OracleLite™ database as Persistent ObjectStore pos variable putting the result in a sess variable with the following code fragment:

POSSession sess=pos.connect(null);

At step 302, a persistent agent is found that corresponds to the class the object belongs to. For example, if the object belongs to a class POSData {String Date; String Time; int channel; int duration;}, then the method invocation to instantiate the persistent agent can be done with the following code fragment:

PersistentAgent pa=sess.findPersistentAgent("POSData", null);

At step 304, the retrieve( ) method is invoked to retrieve a set of objects belong to the class to which the persistent agent corresponds, as long as the objects satisfies the predicate. For example, to retrieve all objects of POSData type that have a channel of 23 in an array called results, the following code fragment may be used:

Object [ ] results=pa.retrieve("channel=23");

In response to this method invention, as set forth as step 306, the persistent agent formulates an appropriate query on the persistent object store based on the predicate to retrieve entries from the data structure in the persistent object store that satisfy the predicate. In the present example involving a relational OracleLite database, the following SQL query might be generated, in which the WHERE clause contains the predicate:

select * from POSData where channel=23;

At step 308, the rows are converted into objects, by mapping the columns of the table to the corresponding fields of the object and storing the values of the columns in the corresponding fields. In addition, the persistent agent updates the internal data structure (such as a hash table or other set-like data structure) to keep track of which objects are now in the program memory.

CONCLUSION

Accordingly, a system, method, and software for implementing object persistence with persistent agents has been described, in which the implementation of object persistence is decoupled from modeling the class. Consequently, the programmer is freed from having to worry about persistence or cluttering the interface of the objects when designing an application, because the persistent agent encapsulates all the necessary functionality.

Furthermore, the encapsulation provided by the persistent agent allows for object persistent to implemented in new environments such as that for mobile users who are only sporadically connected to the database. In this example, the persistent agent can be implemented to use updateable snapshots as the persistent object store, without affecting the design of the class that actually model the application's behavior. In addition, a straightforward facility for allowing optimization hints, such as primary keys, uniqueness constraints, and indexes can be attained.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method for persistently storing an object belonging to a class, wherein the method comprises performing a machine-executed operation involving instructions, wherein the machine-executed operation is at least one of:

a) sending said instructions over transmission media;
b) receiving said instructions over transmission media;
c) storing said instructions onto a machine-readable storage medium; and
d) executing the instructions;

wherein said instructions are instructions which, when executed by one or more processors, cause the one or more processors to perform the steps of:

in response to receiving a request to instantiate a persistent agent for said class, performing the steps of:

(a) creating one or more structures within a persistent object store, wherein said one or more structures have portions that correspond to respective fields of objects belonging to said class; and (b) instantiating a class-specific persistent agent for storing objects that belong to said class, wherein the class-specific persistent agent provides an interface, that includes a routine, for persistently storing the object in said structures within said persistent object store, wherein said class-specific persistent agent may only be used for operations involving objects belonging to said class; and in response to invoking the routine, the class-specific persistent agent storing the object in said one or more structures within the persistent object store, wherein the object is not derived from a persistent object base class.

2. The method according to claim 1, wherein said instructions, when executed by one or more processors, cause the one or more processors to further perform the step of modifying the object in the persistent object store using the interface provided by the class-specific persistent agent.

3. The method according to claim 1, wherein the step of instantiating the class-specific persistent agent includes the step of instantiating the class-specific persistent agent based on a fully qualified name for the class.

4. The method according to claim 1, wherein:

the persistent object store includes a relational database; and the step of the class-specific persistent agent storing the object in said one or more structures within the persistent object store includes the step of the class-specific persistent agent storing the object in at least one database table corresponding to the class.

5. The method according to claim 4, wherein the step of instantiating the class-specific persistent agent includes the steps of:

determining if the at least one database table corresponding to the class has been created; and if the at least one database table is determined not to have been created, then creating the at least one database table.

6. The method according to claim 5, wherein the step of the class-specific persistent agent storing the object in at least one database table includes the step of:

storing values of at least some of a set of fields, of the object, in corresponding columns of the database table.

7. The method according to claim 6, wherein said instructions, when executed by one or more processors, cause the one or more processors to further perform the step of designating at least some of the columns as primary key columns based on a list of corresponding field names of the object.

8. The method according to claim 6, wherein said instructions, when executed by one or more processors, cause the one or more processors to further perform the step of building an index on at least some of the columns based on a list of corresponding field names of the object.

9. The method according to claim 1, wherein said object is a first object, wherein said class is a first class, wherein the first object contains a second object that belongs to a second class, wherein said instructions, when executed by one or more processors, cause the one or more processors to further perform the steps of:

instantiating a second class-specific persistent agent based on said second class, wherein said second class-specific persistent agent may only be used for operations involving objects belonging to said second class, wherein said second class is different than said first class; and storing the second object in the persistent object store based on the second class-specific persistent agent.

10. The method according to claim 1, wherein said instructions, when executed by one or more processors, cause the one or more processors to further perform the step of establishing a session with the persistent object store, wherein the step of instantiating the class-specific persistent agent includes the step of instantiating the class-specific persistent agent based on the session.

11. A method for retrieving a set of objects from a persistent object store, wherein the method comprises performing a machine-executed operation involving instructions, wherein the machine-executed operation is at least one of:
   a) sending said instructions over transmission media;
   b) receiving said instructions over transmission media;
   c) storing said instructions onto a machine-readable storage medium; and
   d) executing the instructions;
   wherein said instructions are instructions which, when executed by one or more processors, cause the one or more processors to perform the steps of:
      in response to a receiving a request to instantiate a persistent agent for a particular class, instantiating a class-specific persistent agent for retrieving objects of said particular class, said class-specific persistent agent provides an interface, that includes a routine, for retrieving objects of said particular class from the persistent object store, wherein the class-specific persistent agent may only be used for operations involving objects that belong to said particular class; and
      in response to invoking the routine, the class-specific persistent agent retrieving the set of objects from the persistent object store.

12. The method according to claim 11, wherein the step of the class-specific persistent agent retrieving the set of objects includes the step of the class-specific persistent agent retrieving the set of objects from the persistent object store based further on a predicate.

13. The method of claim 11, wherein said class-specific persistent agent is instantiated based on a name identifying said particular class.

* * * * *